No. 732,663. Patented June 30, 1903.

UNITED STATES PATENT OFFICE.

OMAR A. STEMPEL, OF LAKELAND, FLORIDA, ASSIGNOR OF ONE-FOURTH TO HERBERT J. DRANE, OF LAKELAND, FLORIDA.

METHOD OF APPLYING PROTECTIVE COMPOSITION.

SPECIFICATION forming part of Letters Patent No. 732,663, dated June 30, 1903.

Application filed December 30, 1902. Serial No. 137,194. (No specimens.)

*To all whom it may concern:*

Be it known that I, OMAR A. STEMPEL, a citizen of the United States, residing at Lakeland, in the county of Polk and State of Florida, have invented new and useful Improvements in Methods of Applying a Protective Composition, of which the following is a specification.

This invention relates to a method of applying a protective or preservative coating for wood or other surfaces or objects exposed to the destructive influences of the weather, fire, water, rodents, and insects.

The primary object of the invention is to provide a composition of matter having the essential characteristics of toughness and durability and yet of a nature so elastic that it will readily adapt itself to the expansion and contraction arising from changes in temperature of the surface to which it may be applied and also the surrounding atmosphere. The main constituent of the present composition is asphaltum, and with the same is mixed certain proportions of asbestos and a body material which tends to render the composition when applied more durable and also having characteristics of preventing the applied composition from being disintegrated or disturbed by the natural elements, as well as by rodents and insects. It is well known that the valuable natural properties of asphaltum are destroyed by evaporation when such material is reduced to a fluid or semifluid state by heat, and in most of the compositions in which this material is introduced the initial or original mixture is obtained by melting the asphaltum and combining therewith other ingredients which may be selected to produce a product having a specific object. It is also well known that in compositions of a preservative or protective nature wherein asphaltum is mainly used or is the sole ingredient very little resistance is set up to the attack of rodents or insects, and without the introduction of some obstructive material a covering of asphaltum without other ingredients soon becomes ineffective as a protective means. Moreover, asphaltum alone will not resist the destructive influences of fire, and as a covering it is always subject to variations in thickness by changes in temperature.

The present composition aims to overcome the disadvantages heretofore experienced in the use of protective and preservative compositions and maintains the desired natural qualities of asphaltum.

The composition consists, specifically stated, of alphaltum, asbestos, and some obstructive body material, such as sand, ground stone, pulverized limestone, kaolin, or the like. The proportions of these several constituents may be varied in accordance with the covering desired to be used for a specific purpose; but for all practical purposes it has been found that ten per cent. of asbestos, twenty per cent. of asphaltum, and seventy per cent. of an obstructive body material, all by volume, give good results. In mixing the composition no heat whatever is used, the asphaltum being finely ground and having the asbestos and finely comminuted or ground obstructive body material added thereto in a cold state. The finely-ground asphaltum and finely-comminuted stone, limestone, kaolin, or sand are first thoroughly mixed until they are fully commingled, and the asbestos in then added and the entire mass stirred or otherwise agitated to equalize the distribution of the asbestos therein. It will be understood that by mixing the ingredients in a cold state none of the valuable properties of asphaltum are lost, and when the composition is so prepared it will be ready for application.

It is proposed to cover wood surfaces, such as roofs, shingles, boards, or other coverings usually employed for this purpose, and including sheet metal and metal alloys, and also piles, boat hulls or bodies, and other wooden or metal devices submerged in or exposed to the action of water. The introduction of the body materials—such as sand, ground stone or the like, as heretofore set forth—tends to render the composition more concrete or solid without materially detracting from its desirable toughness or rendering it too brittle, and, further, such sand, ground stone, or analogous material obstructs the attack of rodents, such as rats and mice, and penetrations or borings by teredo navalis and barnacles, and by overcoming any tendency of disintegration of the asphaltum by means just specified its waterproofing and preservative qualities remain unimpaired. Furthermore, by the introduction of asbestos the composition is rendered fireproof.

In applying the composition the surface which it is desired to cover will be dusted with or have a thin layer of powdered asphaltum applied thereto and a hot fusing-plate or other heated implement will be thoroughly moved thereover to melt the asphaltum, and thereby fill up any irregularities in interstices, pores, or openings and at the same time provide a priming-coat on which to apply the final coat embodying the composition of materials heretofore set forth. The priming coat or covering of powdered asphaltum heated and fused in the manner set forth will cause the composition to more firmly adhere to the wood or metal desired to be covered thereby. After the priming-coat of powdered asphaltum has been fused on the surface to be covered the composition in a cold state is spread over the said surface on the fused asphaltum to any degree of thickness desired or required, and a suitable fusing implement is then regularly applied to the composition to cause the same to form a homogeneous mass and firmly adhere to the surface or object to be covered. By having the asphaltum in a finely ground or powdered state air-holes and rotten or unstable spotting will be avoided in contradistinction to the use of asphaltum granules or lumps, which do not always become fully fused and form undercavities, which weaken the covering.

After the covering has been applied, as stated, it will resist fracture by blows delivered thereto and become so thoroughly fastened to the surface over which it is applied that it has been found by experiment to remain intact though the material on which it is disposed may be broken or severed. Moreover, it will be seen that the introduction of oils or turpentine in the composition is avoided, and the materials on which the covering is placed will be free from attack and injury by such oils. The absence of resin in the composition is also an important feature in view of the tendency of resin to attack any material on which it is disposed by virtue of the turpentine resident therein and a further disadvantage of rendering all compositions in which it is introduced exceptionally brittle and unreliable to resist fracture or surface impact.

The composition has a general use, though only a few applications have been specified, and it can be readily transported in bulk from a source of manufacture without losing any of its desired characteristics in view of the fact that no heat is employed in compounding the same.

Having thus fully described the invention, what is claimed as new is—

The herein-described method consisting of applying powdered asphaltum to a surface to be protected, fusing the asphaltum, and then applying a protective covering in a cold state consisting of asphaltum, asbestos and an obstructive material and finally fusing said covering by the application of heat thereto.

In testimony whereof I affix my signature in presence of two witnesses.

OMAR A. STEMPEL.

Witnesses:
JOHN L. FLETCHER,
CHAS. S. HYER.